(12) United States Patent
Hwang

(10) Patent No.: US 8,947,393 B2
(45) Date of Patent: Feb. 3, 2015

(54) TOUCH SCREEN PANEL IN RESISTIVE TYPE

(75) Inventor: Kyung-Ho Hwang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 202 days.

(21) Appl. No.: 13/104,861

(22) Filed: May 10, 2011

(65) Prior Publication Data

US 2012/0113048 A1 May 10, 2012

(30) Foreign Application Priority Data

Nov. 8, 2010 (KR) .......................... 10-2010-0110269

(51) Int. Cl.
G06F 3/045 (2006.01)
G06F 3/047 (2006.01)

(52) U.S. Cl.
CPC .................................... *G06F 3/047* (2013.01)
USPC ......................................................... 345/174

(58) Field of Classification Search
CPC ..................................................... G06F 3/047
USPC ...................... 345/173–184; 178/18.05, 18.06
See application file for complete search history.

(56) References Cited

U.S. PATENT DOCUMENTS

| | | | | |
|---|---|---|---|---|
| 5,008,497 A * | 4/1991 | Asher | ......................... | 178/18.05 |
| 5,451,724 A * | 9/1995 | Nakazawa et al. | ......... | 178/18.05 |
| 5,631,666 A * | 5/1997 | Tagawa et al. | ................ | 345/104 |
| 6,104,465 A * | 8/2000 | Na et al. | ......................... | 349/152 |
| 6,239,788 B1 * | 5/2001 | Nohno et al. | ................. | 345/173 |
| 6,670,949 B1 * | 12/2003 | Ahn et al. | ..................... | 345/173 |
| 6,738,048 B1 * | 5/2004 | Rundel | .......................... | 345/173 |
| 7,053,887 B2 * | 5/2006 | Kraus et al. | .................... | 345/173 |
| 7,541,946 B2 * | 6/2009 | Fedigan | .......................... | 341/29 |
| 8,059,103 B2 * | 11/2011 | Geaghan | ....................... | 345/173 |
| 8,248,275 B2 * | 8/2012 | Li | .................................... | 341/22 |
| 8,269,743 B2 * | 9/2012 | Kuo et al. | ...................... | 345/174 |
| 8,294,690 B2 * | 10/2012 | Yeh et al. | ..................... | 345/174 |
| 8,300,028 B2 * | 10/2012 | Yeh et al. | ..................... | 345/174 |
| 8,319,744 B2 * | 11/2012 | Li | ................................. | 345/173 |
| 8,330,727 B2 * | 12/2012 | Westerman et al. | .......... | 345/173 |
| 8,330,741 B1 * | 12/2012 | Camarota | ..................... | 345/174 |
| 2003/0071797 A1 * | 4/2003 | Chang et al. | .................. | 345/173 |

(Continued)

FOREIGN PATENT DOCUMENTS

KR 10-20100032283 A 3/2010
KR 10-20100050624 A 5/2010

*Primary Examiner* — Quan-Zhen Wang
*Assistant Examiner* — Chun-Nan Lin
(74) *Attorney, Agent, or Firm* — Christie, Parker & Hale, LLP

(57) ABSTRACT

A resistive touch screen panel includes: a first substrate having a first side; a second substrate opposing the first substrate, the second substrate having a first side facing the first side of the first substrate; a plurality of detecting electrodes arranged in a first direction on the first side of the first substrate; a plurality of power electrodes arranged in a second direction that crosses the first direction on the first side of the second substrate; a power supply unit for supplying power to the power electrodes and the detecting electrodes; and a plurality of resistors between the power supply unit and the power electrodes, in which the resistors have resistances determined by $2^n C$ (n is a nonnegative integer and C is a constant) and the resistances corresponding to different ones of the power electrodes are different.

7 Claims, 6 Drawing Sheets

(56) References Cited

U.S. PATENT DOCUMENTS

| | | | |
|---|---|---|---|
| 2003/0231169 A1* | 12/2003 | Aroyan et al. | 345/173 |
| 2004/0119661 A1* | 6/2004 | Kunimatsu et al. | 345/7 |
| 2004/0145577 A1* | 7/2004 | Yajima et al. | 345/173 |
| 2004/0207606 A1* | 10/2004 | Atwood et al. | 345/173 |
| 2004/0246149 A1* | 12/2004 | Fedigan | 341/22 |
| 2005/0118922 A1* | 6/2005 | Endo | 445/24 |
| 2006/0066585 A1* | 3/2006 | Lin | 345/173 |
| 2006/0097991 A1* | 5/2006 | Hotelling et al. | 345/173 |
| 2007/0008281 A1* | 1/2007 | Yajima et al. | 345/156 |
| 2007/0089914 A1* | 4/2007 | Yang et al. | 178/18.05 |
| 2007/0289860 A1* | 12/2007 | Newman et al. | 200/522 |
| 2008/0006453 A1* | 1/2008 | Hotelling | 178/18.06 |
| 2008/0007539 A1* | 1/2008 | Hotelling | 345/173 |
| 2008/0252608 A1* | 10/2008 | Geaghan | 345/173 |
| 2009/0120695 A1* | 5/2009 | Liu et al. | 178/18.03 |
| 2009/0128511 A1* | 5/2009 | Sinclair et al. | 345/174 |
| 2009/0128512 A1* | 5/2009 | Segev et al. | 345/174 |
| 2009/0128514 A1* | 5/2009 | Liu et al. | 345/174 |
| 2009/0251436 A1* | 10/2009 | Keskin | 345/174 |
| 2009/0273573 A1* | 11/2009 | Hotelling | 345/173 |
| 2009/0284398 A1* | 11/2009 | Shen et al. | 341/33 |
| 2009/0303400 A1* | 12/2009 | Hou et al. | 349/12 |
| 2009/0314551 A1* | 12/2009 | Nakajima | 178/18.05 |
| 2009/0322685 A1* | 12/2009 | Lee | 345/173 |
| 2009/0322699 A1* | 12/2009 | Hansson | 345/174 |
| 2010/0026660 A1* | 2/2010 | Kitamura | 345/174 |
| 2010/0037709 A1* | 2/2010 | Yeh et al. | 73/862.046 |
| 2010/0053093 A1* | 3/2010 | Kong et al. | 345/173 |
| 2010/0053094 A1* | 3/2010 | Kong et al. | 345/173 |
| 2010/0073325 A1* | 3/2010 | Yang | 345/174 |
| 2010/0097343 A1* | 4/2010 | Fang | 345/174 |
| 2010/0116561 A1* | 5/2010 | Lin et al. | 178/18.01 |
| 2010/0117976 A1* | 5/2010 | Lin et al. | 345/173 |
| 2010/0117983 A1* | 5/2010 | Lin et al. | 345/174 |
| 2010/0117984 A1* | 5/2010 | Lin et al. | 345/174 |
| 2010/0127711 A1* | 5/2010 | Chen | 324/522 |
| 2010/0141604 A1* | 6/2010 | Cai et al. | 345/174 |
| 2010/0156840 A1* | 6/2010 | Frey et al. | 345/174 |
| 2010/0295819 A1* | 11/2010 | Ozeki et al. | 345/174 |
| 2010/0302269 A1* | 12/2010 | Morimoto | 345/589 |
| 2010/0328263 A1* | 12/2010 | Lin | 345/174 |
| 2011/0012864 A1* | 1/2011 | Lin | 345/174 |
| 2011/0025623 A1* | 2/2011 | Lin | 345/173 |
| 2011/0134072 A1* | 6/2011 | Li et al. | 345/174 |
| 2011/0157083 A1* | 6/2011 | Hershman et al. | 345/174 |
| 2011/0279409 A1* | 11/2011 | Salaverry et al. | 345/174 |
| 2011/0291986 A1* | 12/2011 | Rebeschi et al. | 345/174 |
| 2012/0086670 A1* | 4/2012 | Teil et al. | 345/174 |
| 2012/0146941 A1* | 6/2012 | Shin | 345/174 |
| 2013/0009908 A1* | 1/2013 | Kuo | 345/174 |

* cited by examiner

TOUCH SCREEN PANEL IN RESISTIVE TYPE

CROSS-REFERENCE TO RELATED APPLICATION

This application claims priority to and the benefit of Korean Patent Application No. 10-2010-0110269, filed on Nov. 8, 2010, in the Korean Intellectual Property Office, the entire content of which is incorporated herein by reference.

BACKGROUND

1. Field

Aspects of embodiments according to the present invention relate to a touch screen panel in a resistive type.

2. Description of Related Art

Touch screen panels are input devices that select contents displayed on the screen of, for example, an image display device using a person's hand or other suitable object to input commands of a user. To this end, touch screen panels are provided on a front face of the image display device and convert positions where the person's hand or the object directly contacts the panel into electrical signals. Accordingly, the instruction corresponding to the contact point is received as an input signal.

As touch screen panels can replace separate input devices that are connected to the image display device, such as a keyboard or a mouse, the use of the touch screen panels is expanding.

There are different types of touch screen panels, such as a resistive type, a light sensing type, and a capacitive type. Of these types, the resistive touch screen panel has relatively high durability against physical shock, maintains uniform performance against changes in external environment (such as a change in lighting), and is thin and light to be suitable for portable terminals, for which it is widely used.

Resistive touch screen panels may be capable of detecting touches made at two different points (that is, a multi-touch). However, it may take a certain amount of time to recognize a multi-touch, such that it is difficult for such panels to respond to rapid continuous touches.

SUMMARY

Aspects of embodiments according to the present invention relate to a touch screen panel in a resistive type and, in particular, to a resistive touch screen panel that can recognize a multi-touch. In addition, aspects of embodiments of the present invention are directed to a resistive touch screen panel that can quickly respond to continuous touches by efficiently recognizing a multi-touch.

In an exemplary embodiment according to the present invention, a resistive touch screen panel is provided. The resistive touch screen panel includes: a first substrate having a first side; a second substrate opposing the first substrate, the second substrate having a first side facing the first side of the first substrate; a plurality of detecting electrodes arranged in a first direction on the first side of the first substrate; a plurality of power electrodes arranged in a second direction that crosses the first direction on the first side of the second substrate; a power supply unit for supplying power to the power electrodes and the detecting electrodes; and a plurality of resistors between the power supply unit and the power electrodes. The resistors have resistances determined by $2^{n}C$ (n is a nonnegative integer and C is a constant) and the resistances corresponding to different ones of the power electrodes are different.

The resistive touch screen panel may further include one or more dot spacers between the first substrate and the second substrate such that the detecting electrodes and the power electrodes are spaced apart from each other.

The resistive touch screen panel may further include a touch detecting unit for detecting current from the detecting electrodes.

The detecting electrodes may be arranged at regular intervals and include division electrodes electrically connected with each other.

The division electrodes of the detecting electrodes may have circular shapes.

The power electrodes may be arranged at regular intervals and include division electrodes electrically connected with each other.

The division electrodes of the power electrodes may have circular shapes.

The resistive touch screen panel may further include separate ones of the resistors for separate ones of the division electrodes.

According to embodiments of the present invention described above, it is possible to provide a touch screen panel in a resistive type that is highly responsive to continuous touches, in addition to efficiently recognizing a multi-touch.

BRIEF DESCRIPTION OF THE DRAWINGS

The accompanying drawings, together with the specification, illustrate exemplary embodiments of the present invention, and, together with the description, serve to explain aspects and principles of the present invention.

DETAILED DESCRIPTION

Figure 1:
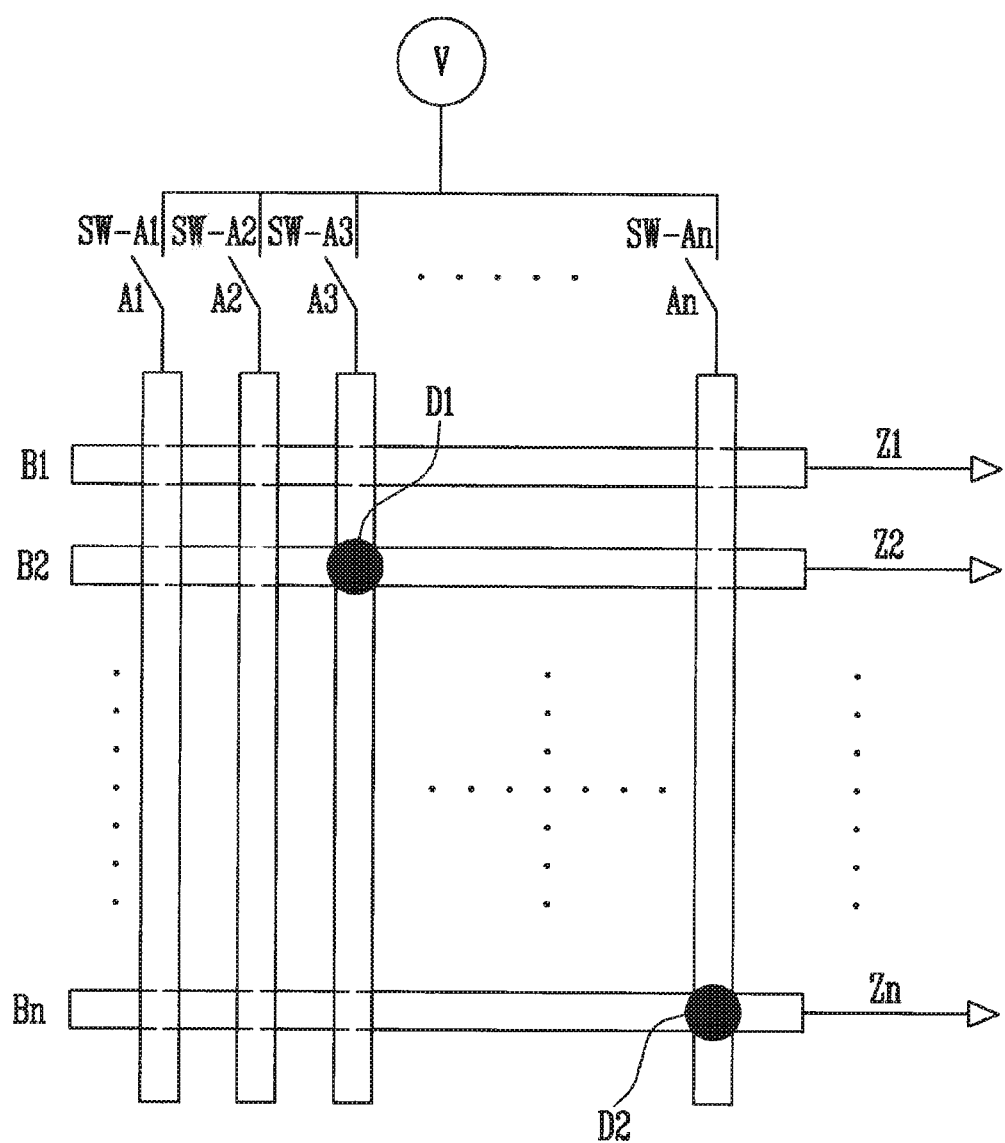
FIG. 1 is a diagram showing a comparable resistive touch screen panel capable of recognizing a multi-touch.

Hereinafter, certain exemplary embodiments according to the present invention will be described with reference to the accompanying drawings. Here, when a first element is described as being coupled to a second element, the first element may be directly coupled to the second element or may be indirectly coupled to the second element via one or more third elements. Further, some of the elements that are not essential to a complete understanding of the invention are omitted for clarity. Also, like reference numerals refer to like elements throughout.

Aspects and features of the present invention and methods to achieve them will be clear from exemplary embodiments described below in detail with reference to the accompanying drawings. However, the present invention is not limited to the embodiments described hereafter and may be implemented in various ways. Further, connection of a part with another part includes direct connection and electric connection of the parts with another part therebetween. Further, parts not relevant to the particular exemplary embodiment may be omitted to more clearly describe the embodiment, and like components are given like reference numerals throughout the specification.

FIG. 1 is a diagram showing a comparable resistive touch screen panel capable of recognizing a multi-touch.

Referring to FIG. 1, a plurality of separate lower electrodes B1, B2, . . . , Bn is on a lower substrate and a plurality of separate upper electrodes A1, A2, . . . , An (that perpendicularly cross the lower electrodes B1, B2, . . . , Bn) is on an upper plate. According to the operation of the resistive touch screen panel, detecting voltage V is sequentially applied to the upper electrodes A1 to An, and voltages Z1, Z2, . . . , Zn are measured from the lower electrodes B1, B2, . . . , Bn by sequentially turning on switches SW-A1, SW-A2, . . . , SW-An connected to a voltage source while turning off the other switches.

If a touch is made at a specific position (for example, at touched point D1 or touched point D2), the corresponding upper electrode and the corresponding lower electrode come in contact at the touched point D1 or D2. That is, the crossing regions of the upper electrodes A1, A2, . . . , An and the lower electrodes B1, B2, . . . , Bn operate as switches, and when a user presses a specific point D1 or D2, an effect, such as that of a switch being closed, is generated, such that the touched point can be detected by an output signal corresponding to the effect.

In the resistive touch screen panel of FIG. 1, since the upper electrodes A1, A2, . . . , An and the lower electrodes B1, B2, . . . , Bn are patterned at predetermined distances and divided, they do not electrically influence each other, even if touches are made at two points (such as D1 and D2), such that it is possible to implement a multi-touch. However, it takes a predetermined time to sequentially apply detecting voltage to the upper electrodes A1, A2, . . . , An in order to recognize a multi-touch, such that it is difficult to respond to rapid continuous touches in the resistive touch screen panel of FIG. 1.

Figure 2:
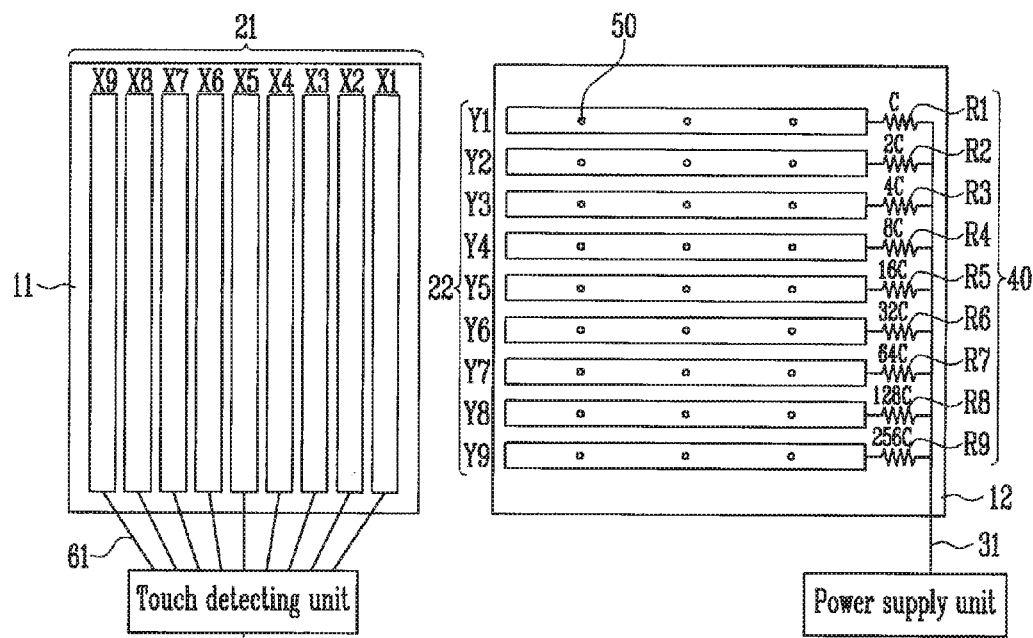
FIG. 2 is a side-by-side display showing two substrates of a resistive touch screen panel according to an embodiment of the present invention.

FIG. 2 is a side-by-side display showing two substrates of a resistive touch screen panel according to an embodiment of the present invention.

Referring to FIG. 2, the resistive touch screen panel includes a first substrate 11, a second substrate 12, a plurality of detecting electrodes 21, a plurality of source (power) electrodes 22, a power supply unit 30, and a plurality of resistors 40. The first substrate 11 and the second substrate 12 oppose each other from a distance (for example, a predetermined distance) and have detecting electrodes 21 and power electrodes 22 facing each other on opposing sides, respectively. The first substrate 11 and the second substrate 12 may be, for example, transparent films made of plastic or silicon or may be transparent glass substrates or plastic substrates.

The detecting electrodes 21 are arranged at regular intervals in a first direction (e.g., vertically) on the first substrate 11. Further, the detecting electrodes 21 are electrically connected with a touch detecting unit 60 by detecting lines 61.

The power electrodes 22 are arranged at regular intervals in a second direction (e.g., horizontally) crossing the first direction (e.g., vertically) on the second substrate 12. Further, the power electrodes 22 are electrically connected with a power supply 30 by power lines 31.

The detecting electrodes 21 and the power electrodes 22 may be made of a transparent conductive material, such as any one of ITO (Indium-Tin-Oxide), and IZO (Indium-Zinc-Oxide), ITZO (Indium-Tin-Zinc-Oxide), or combinations of them, and although the electrodes 21 and 22 are formed in bar shapes in FIG. 2, they may be formed in various shapes, including a diamond and a circle. Further, the detecting electrodes 21 and the power electrodes 22 are spaced apart at distances (for example, predetermined distances) from each other. For the configuration shown in FIG. 2, dot spacers 50 are located between (to help separate) the detecting electrodes 21 and the power electrodes 22. For instance, the dot spacers 50 may keep the detecting electrodes 21 and the power electrodes 22 separated by a distance (for example, a predetermined distance) from each other.

The power lines 31 and the detecting lines 61 may be made of low-resistive opaque materials, such as Mo, Ag, Ti, Cu, Al, and Mo/Al/Mo, in addition to transparent conductive materials such as those listed above. The power supply unit 30 supplies common voltage V to the power electrodes 22 through the power lines 31. The touch detecting unit 60 detects current, which flows from the detecting electrodes 21, from the detecting lines 61.

Resistors 40 having a resistance (for example, a predetermined resistance) are between the power supply unit 30 and the power electrodes 22. Therefore, as shown in FIG. 2, the resistors 40 are located between the power electrodes 22 and the power lines 31.

In an exemplary embodiment, the resistance of the resistors 40 is determined by the formula $2^n C$, where n is a nonnegative integer (for example, corresponding to an electrode (or row) number), and C is a constant. Accordingly, each of the resistances is different, depending on the value of n, and the units of resistance may be in ohms. The reason why the resistances are set as described above is for finding the Y-axis coordinate of a touch point, as will be described.

Figure 3:
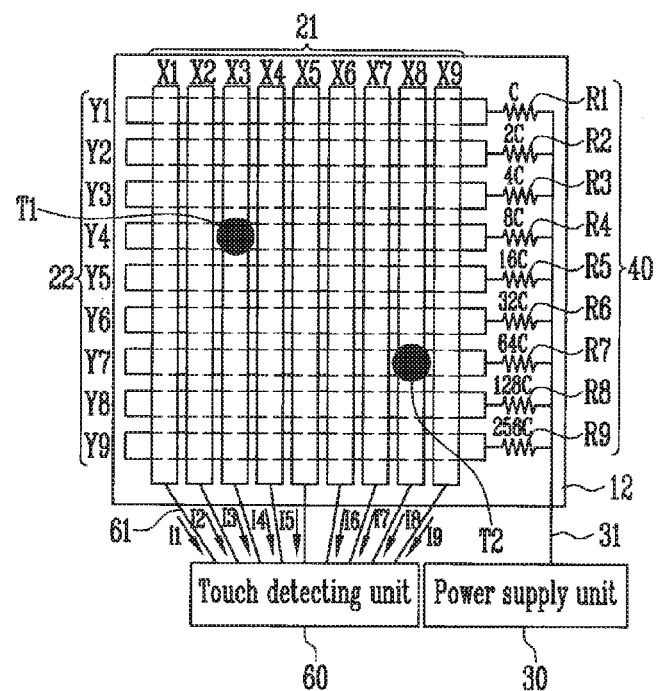
FIG. 3 is diagram showing when a multi-touch is made at different detecting electrodes of the touch screen panel of FIG. 2.
Figure 4:
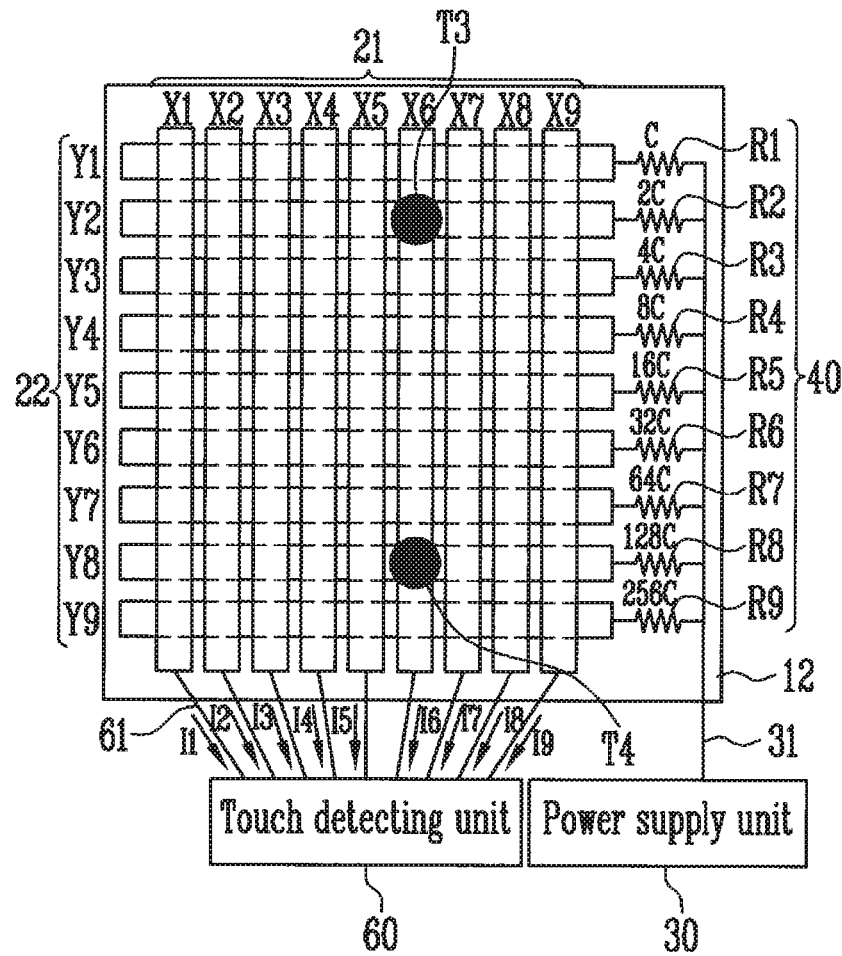
FIG. 4 is diagram showing when a multi-touch is made at the same detecting electrode of the touch screen panel of FIG. 2.
Figure 5:
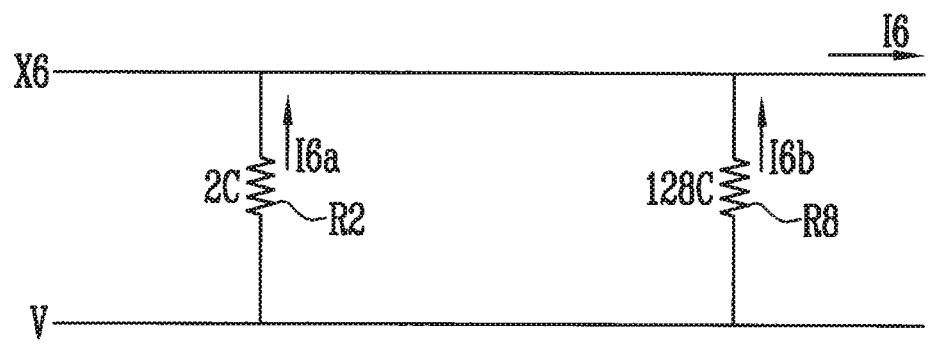
FIG. 5 is a diagram showing a circuit formed by the multi-touch shown in FIG. 4.

FIG. 3 shows a touch taking place at two different locations on the touch screen panel of FIG. 2, resulting in a multi-touch made at different detecting electrodes. FIG. 4 is a diagram showing when a multi-touch is made at the same detecting electrode of the touch screen panel of FIG. 2. FIG. 5 is a diagram showing a circuit formed by the multi-touch shown in FIG. 4.

Hereinafter, the operation of recognizing a touch of the present invention is described in detail with reference to FIGS. 2 to 5. Although nine detecting electrodes 21 from X1 to X9 and nine power electrodes 22 from Y1 to Y9 are shown for the convenience of description in FIGS. 2 to 4, the numbers of electrodes 21 and 22 may be variously modified in other embodiments of the present invention. Nine resistors 40 from R1 to R9 are between the power electrodes 22 and the power lines 31.

As described above, the resistances of the resistors 40 are determined by $2^n C$ (n is a nonnegative integer and C is a constant). For example, it is shown in FIGS. 2 to 4 that when n ranges sequentially from 0 to 8 to correspond to the resistors 40 from R1 to R9. Therefore, R1, R2, R3, R4, R5, R6, R7, R8, and R9 have resistances of C, 2C, 4C, 8C, 16C, 32C, 64C, 128C, and 256C, respectively.

The operation of recognizing a touch when a multi-touch is made at different detecting electrodes 21 is described first with reference to FIG. 3. It is assumed that the corresponding detecting electrodes 21 and power electrodes 22 concurrently (for example, simultaneously) come in contact at points T1 and T2 (corresponding to the crossing region of detecting electrode X3 and power electrode Y4, and the crossing region of detecting electrode X8 and power electrode Y7, respectively) when a user presses the first substrate 11 or the second substrate 12 with a finger or an object.

The detecting electrode X3 and the power electrode Y4 come in contact at the point T1, such that current I3 detected from the detecting electrode X3 becomes common voltage V/8C (that is, common voltage V divided by resistance 8C). Further, the detecting electrode X8 and the power electrode Y7 come in contact at the point T2, such that current I8 detected at the detecting electrode X8 becomes V/64C.

Therefore, the X-axis coordinate (that is, the corresponding detecting electrode 21) of the point T1 is X3 and the X-axis coordinate of the point T2 is X8. Further, the Y-axis coordinates (that is, the corresponding power electrodes 22) of the point T1 and the point T2 are calculated from the detected current I3 and I8. That is, since the common voltage V is already known, the resistance can be calculated back from the current I3 and I8 received in the touch detecting unit 60. Therefore, the Y-axis coordinate of the point T1 is Y4, because the current I3 has flowed through the resistor R4 having a resistance of 8C. Similarly, the Y-axis coordinate of the point T2 is Y7, since the current I8 has flowed through the resistor R7 having a resistance of 64C.

The operation of recognizing a touch when a multi-touch is made at the same detecting electrode 21 is described next with reference to FIGS. 4 and 5.

In this case, it is assumed that the corresponding detecting electrodes 21 and power electrodes 22 concurrently (for example, simultaneously) come in contact at points T3 and T4 (corresponding to the crossing region of detecting electrode X6 and power electrode Y2, and the crossing region of detecting electrode X6 and power electrode Y8, respectively) when a user presses the first substrate 11 or the second substrate 12 with a finger or an object.

The detecting electrode X6 and the power electrode Y2 come in contact at the point T3 while the detecting electrode X6 and the power electrode Y8 come in contact at the point T4, such that the circuit shown in FIG. 5 is implemented. Therefore, the current I6 flowing from the detecting electrode X6 to the touch detecting unit 60 is the sum of the current I6a flowing through the resistor R2 having a resistance of 2C and the current I6b flowing through the resistor R8 having a resistance of 128C. In this case, the current I6a is V/2C and the current I6b is V/128C, such that the current I6 is the sum of them, that is, V/2C+V/128C.

Since the current I6 has been detected at the detecting electrode X6, it can be seen that the X-axis coordinates of the points T3 and T4 are X6. The Y-axis coordinates of the touch points T3 and T4 are measured by the characteristic of n-th powers of 2 ($2^n$), which are used to set the resistances. That is, the above numbers may be extracted from the sum of the numbers determined by the different powers of 2 ($2^n$), as long as the powers of 2 are different for each of the different resistors 40. This is because the sum of different powers of two is unique for the same reason that any integer has a unique representation when expressed in binary (base 2).

For example, 3 can be expressed by the sum of $2^1$ and $2^0$, and similarly, 5 can be expressed by the sum of $2^2$ and $2^0$. In similar fashion, 77 can be expressed as the sum of $2^6$, $2^3$, $2^2$, and $2^0$, and 125 can be expressed as the sum of $2^6$, $2^5$, $2^4$, $2^3$, $2^2$, and $2^0$. Accordingly, it is possible to calculate the resistances from the current I6 acquired from the characteristics, the common voltage V, and the constant C, which can be established during the design of the touch screen panel.

Therefore, since it can be seen that the current I6 is the sum of the current I6a and I6b that have flowed through the resistance R2 having a resistance of 2C and the resistor R8 having a resistance of 128C, the Y-axis of the point T3 is Y2 and the Y-axis of the point T4 is Y8. Therefore, the extra time needed for sequentially applying detecting voltage V, as shown in the touch screen panel of FIG. 1, can be saved in embodiments of the present invention (as shown above for the exemplary embodiment of FIGS. 2-4), such that it is possible to simply and quickly recognize a touch.

Figure 6:
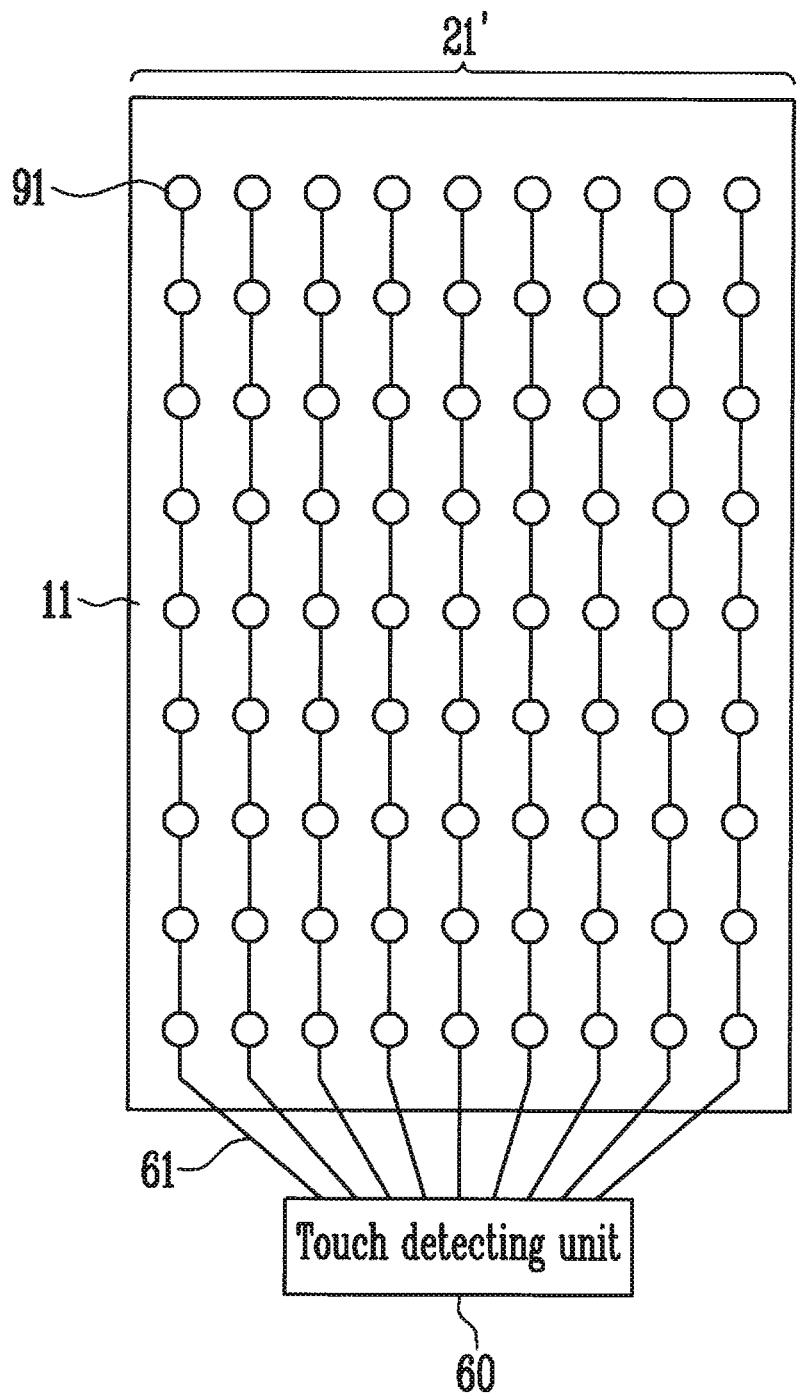
FIG. 6 is a diagram showing detecting electrodes according to another embodiment of the present invention.

FIG. 6 is a diagram showing detecting electrodes 21' according to another embodiment of the present invention.

Referring to FIG. 6, the detecting electrodes 21' are arranged at regular intervals and may be composed of separate (division) electrodes 91 that are electrically connected with each other (for example, in the column direction). The division electrodes 91 of the detecting electrodes 21' are etched to have circular shapes, which may be a more efficient shape and perform better for a resistive touch screen panel than the bar shape shown in FIGS. 2-4. To electrically connect the division electrodes 91, the division electrodes 91 may be electrically connected by transparent conductive materials left from the etching or electrically connected by the detecting lines 61.

Figure 7:
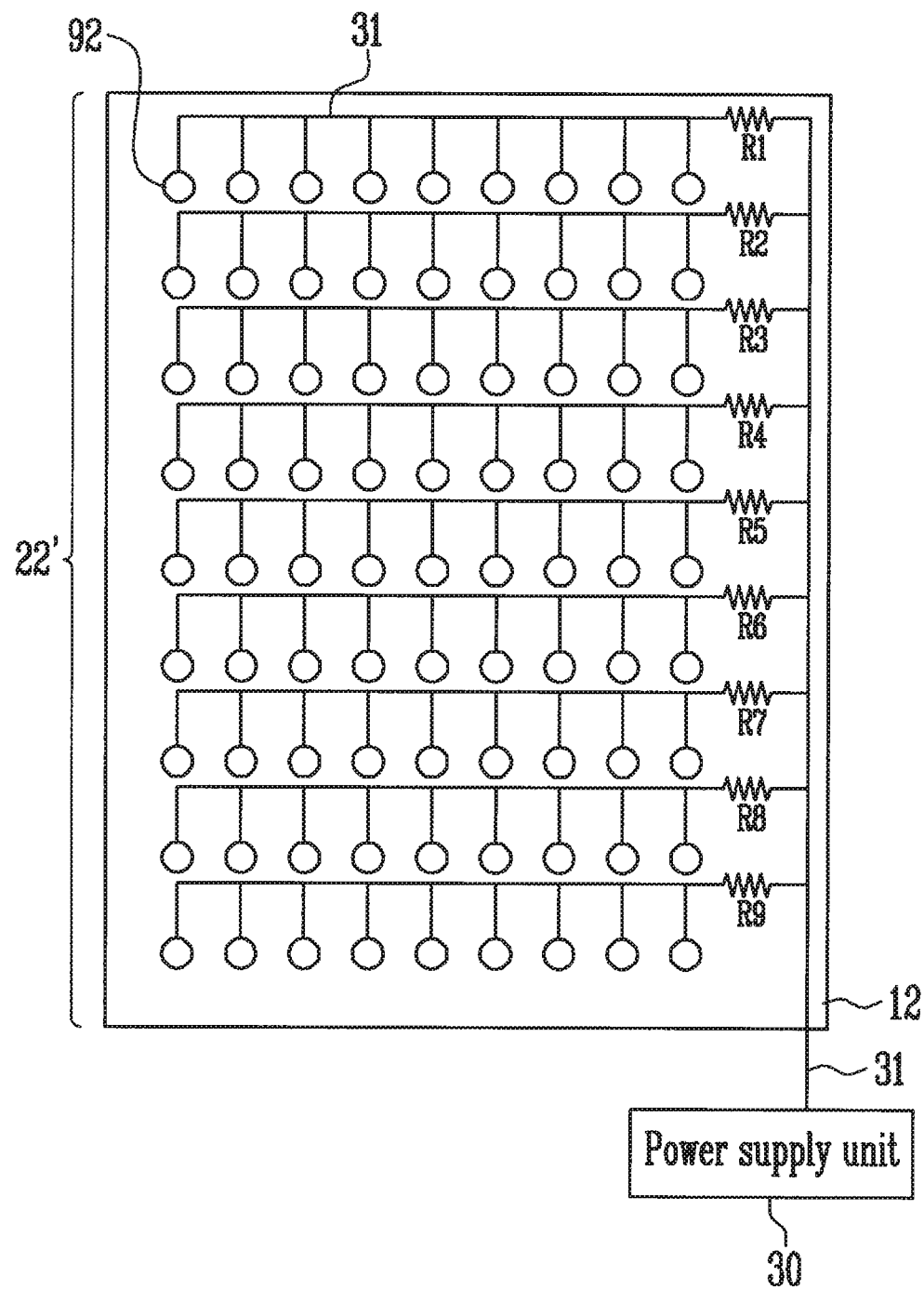
FIG. 7 is a diagram showing power electrodes according to another embodiment of the present invention.

FIG. 7 is a diagram showing power electrodes 22' according to another embodiment of the present invention.

Referring to FIG. 7, the power electrodes 22' are arranged at regular intervals and may be composed of separate (division) electrodes 92 that are electrically connected with each other (for example, in the row direction). The division electrodes 92 of the power electrodes 22' are etched to have circular shapes, which may be a more efficient shape and perform better for a resistive touch screen panel than the bar shape shown in FIGS. 2-4. To electrically connect the division electrodes 92, the division electrodes 92 may be electrically connected by the power lines 31 or electrically connected by the transparent conductive materials left from the etching.

Figure 8:
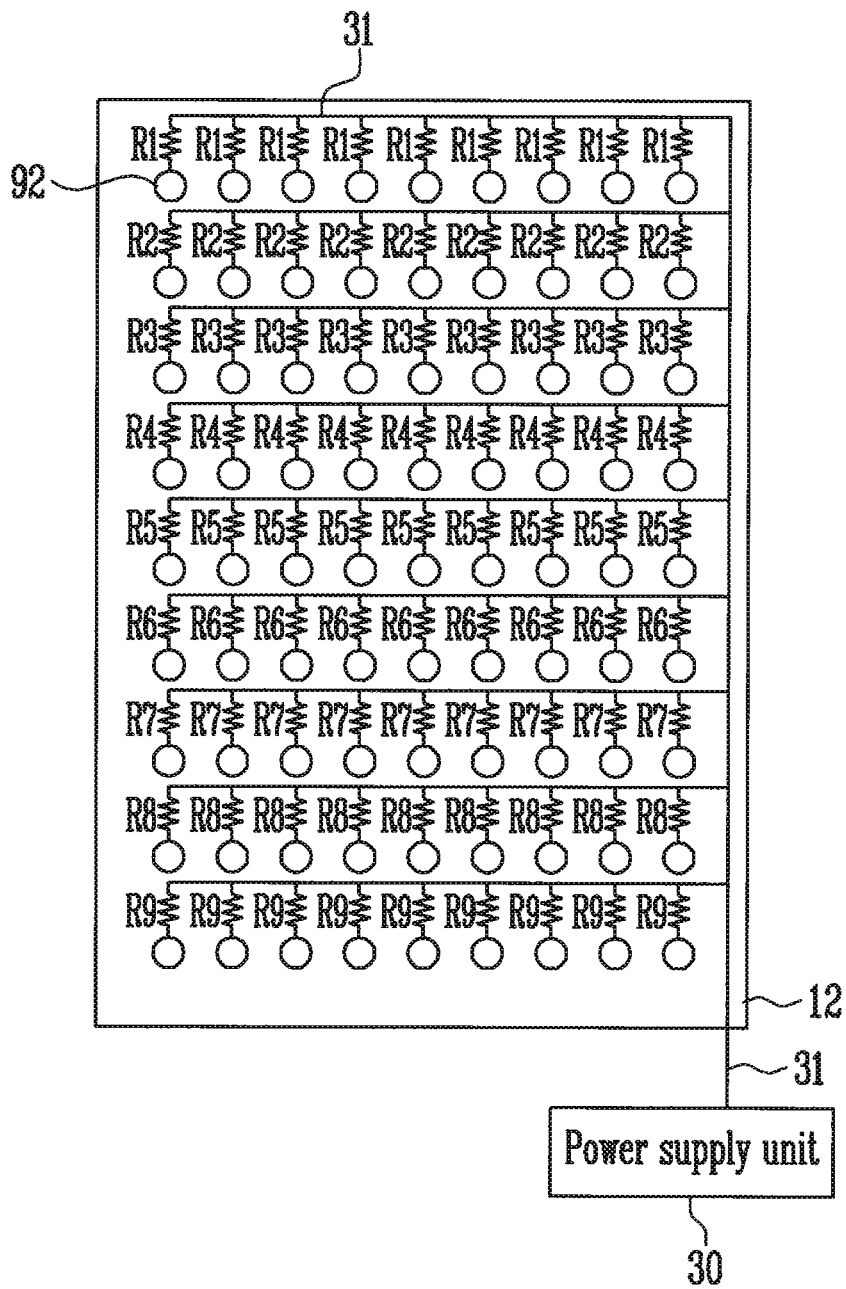
FIG. 8 is a diagram showing a resistance configuration equivalent to that of FIG. 7.

FIG. 8 is a diagram showing a resistance configuration equivalent to that of FIG. 7.

Although only one resistor 40 (for example resistor R1) is connected to the division electrodes 92 of one power electrode 22' in FIG. 7, this may be equivalently represented with a separate resistor connected to each of the division electrodes 92, as in FIG. 8. That is, separate resistors, each having the same resistance, may be disposed between the power lines 31, as shown in FIG. 8, for each of the division electrodes 92 of one power electrode 22'.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A resistive touch screen panel comprising:
   a first substrate having a first side;
   a second substrate opposing the first substrate, the second substrate having a first side facing the first side of the first substrate;
   a plurality of detecting electrodes arranged in a first direction on the first side of the first substrate;
   a plurality of power electrodes arranged in a second direction that crosses the first direction on the first side of the second substrate;
   a power supply unit for supplying power to the power electrodes; and
   a plurality of resistors between the power supply unit and at least a portion of the power electrodes,
   wherein:

the resistors have resistances determined by $2^n C$ (n is a nonnegative integer and C is a constant) and the resistances corresponding to different ones of the power electrodes are different, the power electrodes are arranged at regular intervals, each of the power electrodes comprising a power line extending in the first direction, and a plurality of division electrodes spaced from the power line in the second direction and electrically connected to the power line; and the division electrodes of the power electrodes have circular shapes.

2. The resistive touch screen panel according to claim 1, further comprising one or more dot spacers between the first substrate and the second substrate such that the detecting electrodes and the power electrodes are spaced apart from each other.

3. The resistive touch screen panel according to claim 1, further comprising a touch detecting unit for detecting current from the detecting electrodes.

4. The resistive touch screen panel according to claim 1, wherein the detecting electrodes are arranged at regular intervals and comprise division electrodes electrically connected with each other.

5. The resistive touch screen panel according to claim 4, wherein the division electrodes of the detecting electrodes have circular shapes.

6. The resistive touch screen panel according to claim 1, further comprising separate ones of the resistors for separate ones of the division electrodes.

7. The resistive touch screen panel according to claim 1, wherein the resistors are electrically coupled in parallel to the power supply unit.

* * * * *